US008438162B2

(12) United States Patent
King et al.

(10) Patent No.: US 8,438,162 B2
(45) Date of Patent: May 7, 2013

(54) METHOD AND APPARATUS FOR SELECTING CLUSTERINGS TO CLASSIFY A PREDETERMINED DATA SET

(75) Inventors: Gary King, Brookline, MA (US); Justin Grimmer, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 13/264,493

(22) PCT Filed: Apr. 12, 2010

(86) PCT No.: PCT/US2010/030730
§ 371 (c)(1),
(2), (4) Date: Nov. 18, 2011

(87) PCT Pub. No.: WO2010/120684
PCT Pub. Date: Oct. 21, 2010

(65) Prior Publication Data
US 2012/0197888 A1     Aug. 2, 2012

Related U.S. Application Data

(60) Provisional application No. 61/170,002, filed on Apr. 16, 2009.

(51) Int. Cl.
*G06F 17/30*     (2006.01)

(52) U.S. Cl.
USPC .......................................................... 707/737

(58) Field of Classification Search ............ 707/737
See application file for complete search history.

(56) References Cited

U.S. PATENT DOCUMENTS

| | | | | |
|---|---|---|---|---|
| 7,882,106 | B2 * | 2/2011 | Birdwell et al. | 707/736 |
| 8,095,345 | B2 * | 1/2012 | Hoversten | 703/2 |
| 2004/0111708 | A1 * | 6/2004 | Calder et al. | 717/131 |
| 2007/0005589 | A1 * | 1/2007 | Gollapudi | 707/5 |
| 2007/0271264 | A1 * | 11/2007 | Purang et al. | 707/6 |
| 2007/0271265 | A1 * | 11/2007 | Acharya et al. | 707/6 |
| 2007/0271279 | A1 * | 11/2007 | Acharya | 707/100 |
| 2009/0037390 | A1 * | 2/2009 | Handley | 707/3 |

* cited by examiner

*Primary Examiner* — Sheree Brown
(74) *Attorney, Agent, or Firm* — O'Shea Getz P.C.

(57) ABSTRACT

A method for selecting clusterings to classify a predetermined data set of numerical data comprises five steps. First, a plurality of known clustering methods are applied, one at a time, to the data set to generate clusterings for each method. Second, a metric space of clusterings is generated using a metric that measures the similarity between two clusterings. Third, the metric space is projected to a lower dimensional representation useful for visualization. Fourth, a "local cluster ensemble" method generates a clustering for each point in the lower dimensional space. Fifth, an animated visualization method uses the output of the local cluster ensemble method to display the lower dimensional space and to allow a user to move around and explore the space of clustering.

26 Claims, 3 Drawing Sheets

METHOD AND APPARATUS FOR SELECTING CLUSTERINGS TO CLASSIFY A PREDETERMINED DATA SET

BACKGROUND

Most academics and numerous others routinely attempt to discover useful information by reading large quantities of unstructured text. The corpus of text under study may be literature to review, news stories to understand, medical information to decipher, blog posts, comments, product reviews, or emails to sort, audio-to-text summaries of speeches to comprehend. The purpose is to discover useful information from this array of unstructured text. This is a time-consuming task and the information is increasing at a very fast rate, with the quantity of text equivalent to that in Library of Congress being produced in emails alone every ten minutes.

An essential part of information discovery from unstructured text involves some type of classification. However, classifying documents in an optimal way is an extremely challenging computational task that no human being can come close to optimizing by hand. The task involves choosing the "best" (by some definition) among all possible ways of partitioning a set of n objects (which mathematically is known as the Bell number). The task may sound simple, but merely enumerating the possibilities is essentially impossible for even moderate numbers of documents. For example, the number of partitions of a set of merely 100 documents is 4.76e+115, which is considerably larger than the estimated number of elementary particles in the universe. Even if the number of partitions is limited, the number is still far beyond human abilities; for example, the number ways of classifying 100 documents into two categories is 6.33e+29.

In addition, the task of optimal classification involves more than enumeration. Classification typically involves assessing the degree of similarity between each pair of documents, and then creating a set of clusters called a "clustering" by simultaneously maximizing the similarity of documents within each cluster and minimizing the similarity of documents across clusters. For 100 documents, $$\binom{100}{2} = 4{,}950$$

similarities need to be remembered while sorting documents into categories and simultaneously optimizing across the enormous number of possible clusterings.

This contrasts with a number somewhere between 4 and 7 (or somewhat more, if ordered hierarchically) items a human being can keep in short-term working memory. Various algorithms to simplify this process are still extremely onerous and are likely to lead to sacrificing rather than optimizing. In addition, this process assumes that humans can reliably assess the similarity between documents, which is probably unrealistically optimistic given that the ordering of the categories, the ordering of the documents, and variations in human coder training typically prime human coders to respond in different ways. In practice, inter-coder reliability even for well-trained human coders classifying documents into given categories is rarely very high.

Unfortunately, even fast computers cannot classify, at least not without much forehand knowledge about the substance of the problem to which a particular method is applied. That is, the implicit goal of the prior art—developing a cluster analysis method that works well across applications—is actually known to be impossible due to two theorems. A theorem called the "ugly duckling theorem" holds that, without assumptions, every pair of documents are equally similar and, as a result, every partition of documents is equally similar. Another theorem called the "no free lunch theorem" holds that every possible clustering method performs equally well on average over all possible substantive applications. Thus, any single cluster analysis method can only be optimal with respect to some specific set of substantive problems and type of data set.

Although application-independent clustering is impossible, very little is known about the substantive problems for which existing cluster analysis methods work best. Each of the numerous known cluster analysis methods is justified from a statistical, computational, data analysis, machine learning, or other perspective, but very few are justified in a way that makes it possible to know beforehand the data set with which any one would work well. For example, for a corpus of all blog posts about all candidates during the 2008 U.S. presidential primary season, there are many clustering methods that might work, including model-based approaches, subspace clustering methods, spectral approaches, grid-based methods, graph-based methods, fuzzy k-modes, affinity propagation, self-organizing maps and many others. All these method and many other clustering algorithms are clearly described in the literature, and most have been implemented in available computer code, but very few hints have been given or are known about exactly when any of these methods would work best, well, or better than other methods with this particular data set.

Consider for example, the finite normal mixture clustering model, which is a particularly "principled statistical approach". This model is easy to understand, has a well-defined likelihood, can be interpreted from a frequentist or Bayesian perspective, and has been extended in a variety of ways. However, the "ugly duckling" and "no free lunch theorems" predict that no one approach, including this one, is universally applicable or optimal across applications. Yet, a search of prior art literature produces no suggestion whether a particular corpus, composed of documents of particular substantive topics, structures, or patterns is likely to reveal its secrets best when analyzed with this method. The method has been applied to various data sets, but it is seemingly impossible to know when it will work before looking at the results in any application. Moreover, finite normal mixtures are among the simplest and, from a statistical perspective, most transparent cluster analysis approaches available; knowing which methods work for most other approaches will likely be even more difficult.

Developing intuition for when specific cluster analysis methods work best might be possible in some special cases, but doing so for most of the rich diversity of available methods seems infeasible. Indeed, this problem occurs in unsupervised learning problems almost by definition, since the goal of the analysis is to discover unknown facts. If it were known beforehand something as specific as the model from which the data were generated (up to some unknown parameters), then the analysis would likely not be at an early discovery stage.

SUMMARY

In accordance with the principles of the invention, a method for selecting clusterings to classify a predetermined numerical data set comprises five steps. First, a plurality of known clustering methods are applied, one at a time, to the numerical data set to generate a clustering for each method.

Second, a metric space of clusterings is generated using a metric that measures the similarity between two clusterings generated by a pair of the clustering methods. Third, the metric space is projected to a lower dimensional representation useful for visualization. Fourth, a "local cluster ensemble" method is used to generate a clustering for each point in the lower dimensional space, including points for which no clusterings are generated by the known clustering methods. Fifth, an animated visualization method uses the output of the local cluster ensemble method to display the lower dimensional space and to allow a user to move around and explore the space of clusterings by displaying the clusters in the clustering at each point in the lower dimensional space and smoothly morphing from a clustering generated by one clustering method to clusterings generated by other clustering methods as different points in the space are selected. The visualization aids a researcher in choosing one or a small number of clusterings that are the most useful or informative about the documents.

In one embodiment of the invention, the method is applied to text documents by translating the documents to numerical data that represents the documents before applying the method.

In another embodiment, the metric used to generate the metric space is, for two clusterings, the sum of the conditional entropies of the two clusterings and is a variation of information metric.

In still another embodiment the projection of the metric space to a lower dimension space is performed with a Sammon multidimensional scaling algorithm.

In a further embodiment a new clustering is created at each point in the space of clusterings where no clusterings exists from a weighted average of nearby existing clusterings. More specifically, each weight is determined using a normalized kernel, an averaged similarity matrix is created for the new clustering with the weights and a clustering algorithm is applied to the averaged similarity matrix.

DETAILED DESCRIPTION

Figure 1:
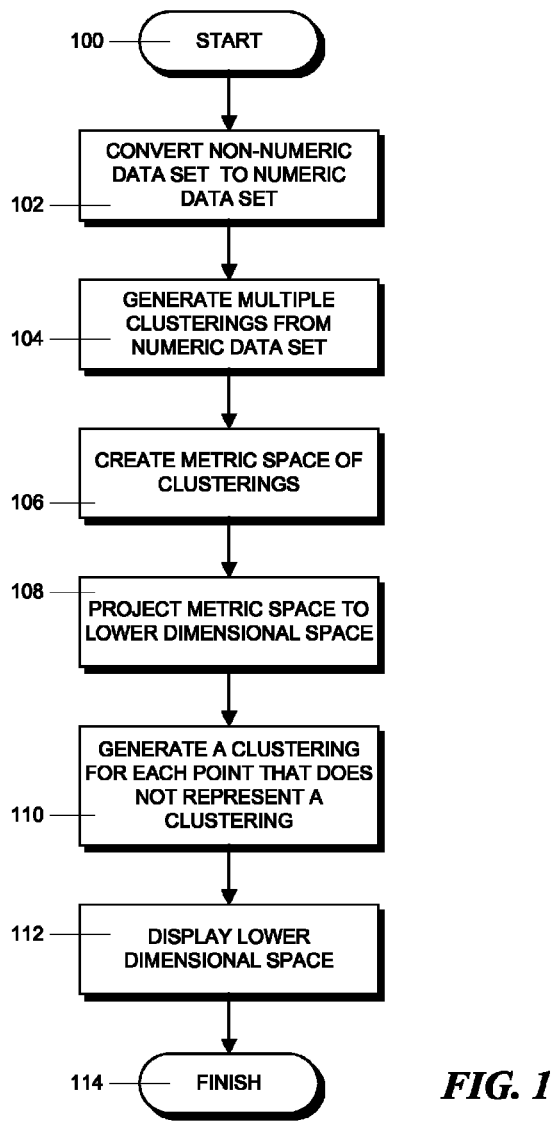
FIG. 1 is a flowchart showing the steps in an illustrative method for selecting clusterings in accordance with the principles of the invention.
Figure 2:
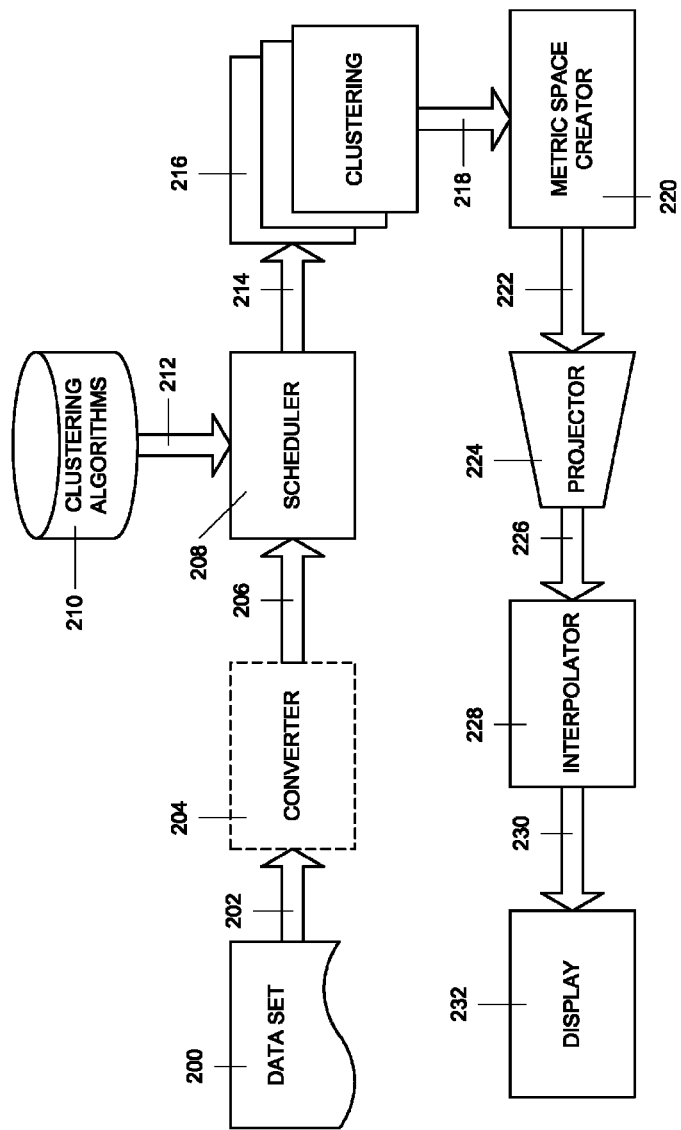
FIG. 2 is a block schematic diagram showing apparatus for performing the method illustrated in FIG. 1.

In accordance with the principles of the invention, an illustrative method and apparatus for performing that method are shown in FIGS. 1 and 2, respectively. The process begins in step 100 and proceeds to step 102 where a non-numeric data set 200 is provided, as indicated by arrow 202, to an optional converter 204, which translates the non-numeric data to a numerical data set, if necessary. This step is necessary only when the items to be clustered are not numerical, such as text documents; the inventive method can omit this step for any data set consisting of numerical measures that represent a set of objects. For purposes of illustration, assume that the documents to be classified form a set of N text documents of variable length. While text documents are used in the discussion below, it would be apparent to those skilled in the art that data other than text documents could be processed in the same manner. In one illustrative embodiment, each document is translated by transforming the text to lower case, removing all punctuation, and replacing each word with its stem. The order of the word stems is then reduced by coding each document with a set of W variables, each variable representing the number of times a word stem is used in that document. The result is that document i (i=1, ..., N) is represented by a W-vector of unigram counts.

While a simple term-document matrix in employed for the illustrative embodiment, the method can easily accommodate many different representations of documents. For example, tf-idf and other term weighting representations could easily be used. Likewise, the many variants of kernel methods—procedures to produce a similarity metric between documents without explicitly representing the words in a matrix—can also be used.

Next, in step 104 of the inventive method, the data set 202 (or the converted data set) is applied as indicated by arrow 206 to a scheduler 208 that applies a plurality of clustering methods 210, one at a time (as indicated by arrow 212), to the numerical set created in step 102 in order to generate a plurality of clusterings 216 as indicated by arrow 214. In the illustrative embodiment, the plurality of clustering methods comprises every published clustering method that has been applied to text and has been used in at least one article by an author other than its developer. These clustering methods include finite mixture models of normal distributions, finite mixture models of multinomial distributions, and estimated using an Expectation Maximization (EM) algorithm and a variational approximation. The clustering methods also include infinite mixture models, based upon the Dirichlet process prior. Another group of methods is based upon the eigenvectors of a modified similarity matrix, known as spectral clustering. Standard methods for clustering are also included, such as k-means, along with a variety of hierarchical clustering methods. Methods that simultaneously cluster both unigrams and documents simultaneously are also included, as are methods that identify exemplar documents for each cluster, and methods that simultaneously embed the documents in a lower dimensional space and then cluster. These clustering methods are described in more detail in a paper entitled "Quantitative Discovery from Qualitative Information: A General-Purpose Document Clustering Methodology", J. Grimmer and G. King which is attached as Appendix A hereto.

Although a large number of clustering methods have been listed above, the inventive method can also operate with any clusterings, however created, including machine-based or human-created categorizations, flat or hierarchical, or soft or hard. It can also operate with different clusterings for existing methods with different tuning parameters, alternative proximity measures among documents, or any other variation. The only requirement is that each clustering "method" form proper clusterings, with each document assigned either to a single cluster or to different clusters with weights that sum to one.

Coupled with this diversity of methods the inventive method uses many ways to measure the similarity between pairs of documents, which is an input to a subset of the clustering methods used here. These include standard measures of distance (Manhattan, Euclidean), angular based measures of similarity (cosine), and many others.

All of these clustering methods can be applied to the numerical data by a straightforward software program that sequentially runs each method. Such a software package could, for example, be written in the R software language.

The next step 106 in the inventive method is to create a metric space of clusterings by providing the clusterings 216 to a metric space creator 220 as indicated by arrow 218. The metric space creator 220 uses a distance metric to measure how similar one clustering is to another. The metric defines the similarity between two clusterings based on how much they agree that each pair of documents appear in the same cluster. In the illustrative embodiment, such a metric is derived by making several assumptions. The first assumption is that the maximum possible distance between any two clusterings is equal to, or can be scaled to be equal to, the distance between a clustering with all documents in one cluster and a clustering with each document in its own cluster. The second assumption is that clusterings with more pairwise agreements (among all pairs of documents) are closer than those with fewer. These first two assumptions preserve geometric properties of a function that counts pairwise disagreements.

A third assumption is that the distance between a clustering and one nested within it (created by refining one of its clusters into a subset of clusters) equals the distance between the refined subset and the amount of information that exists with all refined documents in one cluster, with the remaining unchanged clusters having no effect on the difference. Finally, it is assumed that a maximum distance between clusterings is a function of the number of clusters.

The four assumptions narrow the choice of a possible metric to one: a metric called the variation of information (VI) metric, based on the shared or conditional entropy between two clusterings. Further, it is a distance metric (even though no explicit assumptions were made that the metric should be a distance measure). The VI metric is defined by considering the distance between two arbitrary clusterings, $c_j$ and $c_j'$. Then, the proportion of documents assigned to cluster k in method j and cluster k' in method j' is defined as:

$$p_{jj'}(k, k') = \sum_{i=1}^{N} c_{ikj} c_{ik'j'} / N$$

Given the joint-entropy definition of shared information between $c_j$ and $c_j'$ as:

$$H(c_j, c_j') = -\sum_{k=1}^{K} \sum_{k'=1}^{K} pp_{jj'}(k, k') \log p_{jj'}(k, k')$$

the metric should determine the amount of information cluster $c_j$ adds if we have already observed $c_j'$. A natural way to measure this additional information is with the conditional entropy, $H(c_j|c_j') = H(c_j,c_j') - H(c_j')$, which is made symmetric by adding together the conditional entropies, giving the metric as:

$$d(c_j,c_j') \equiv VI(c_j,c_j') = H(c_j|c_j') + H(c_j'|c_j)$$

The VI metric is described in more detail in an article entitled "Comparing Clusterings: An Information Based Distance", M. Meila, *Journal of Multivariate Analysis* 98(5):873-895 (2007) which article is incorporated in its entirety by reference.

In step 106, the metric is used to generate a metric space in which to represent the various clusterings. The matrix of distances between each pair of K clusterings can be represented with minimal error in a K dimensional space. However, in order to visualize this space, it is projected down to two dimensions in step 108 by providing the metric space generated by creator 220 to projector 224 as indicated by arrow 222. As projection entails the loss of information, the key is to choose a multidimensional scaling method that retains the most crucial information. For purposes of the invention, small distances must be preserved most accurately, as they reflect clusterings to be combined (in the next step 110) into local cluster ensembles. As the distance between two clusterings increases, a higher level of distortion will affect the results less. For the illustrative embodiment, the Sammon multidimensional scaling algorithm was chosen for the projection. This algorithm is disclosed in detail in an article entitled "A Nonlinear Mapping for Data Structure Analysis", J. Sammon, *IEEE Transactions on Computers* 18(5):401-409 (1969), which article is incorporated in its entirety by reference.

As applied to the inventive method, the Sammon algorithm is derived as follows. Let $c_j$ be an $N \times K_j$ matrix (for document i, i=1, ..., N, and cluster k, k=1, ..., $K_j$, characterizing clustering j), each element of which describes whether each document is (0) or is not (1) assigned to each cluster (or for soft clustering methods how a document is allocated among the clusters, but where the sum over k is still one). For each clustering j, the goal is to define its coordinates in a new two-dimensional space $x_j=(x_{j1},x_{j2})$), which is collected into a J×2 matrix X. The Euclidean distance between two clusterings is used in this space, which for clusterings j and j' is represented as $d^{euc}(x_j,x_{j'})$. The goal is to estimate the coordinates X* that minimizes:

$$X^* = arg\min_X \frac{1}{\sum_{j=1}^{J} \sum_{j' \neq j} d(c_j, c_{j'})} \sum_{j=1}^{J} \sum_{j' \neq j} \frac{(d^{euc}(x_j, x_{j'}) - d(c_j, c_{j'}))^2}{d(c_j, c_{j'})}$$

The latter equation encodes the goal of preserving small distances with greater accuracy than larger distances. The denominator contains the distance between two clusterings $d(c_j,c_{j'})$. This implies that distances that are small will be given additional weight in the scaling, while large distances will receive less consideration in the scaling, just as desired.

The next step 110 in the inventive method is to form "local cluster ensembles" from the clusterings by providing the two-dimensional space created by projector 224 to an interpolator 228 as indicated by arrow 226. A "cluster ensemble" is a clustering produced by a specific type of averaging across many individual clusterings as defined in an article entitled "Cluster Ensembles: A Knowledge Reuse Framework for Combining Multiple Partitions", A. Strehl and G. Joydeep, *Journal of Machine Learning Research*, 3:583-617 (2002). This approach has the advantage of creating a new, potentially better, solution but, for purposes of the invention, it has the disadvantage of eliminating the underlying diversity of individual clusterings. Accordingly, this approach is modified to develop a new method of generating "local cluster ensembles", which are defined as new clusterings created at any point in the space of clusterings from a weighted average of nearby existing clusterings. This approach preserves the diversity of the individual clusterings while still generating new clusterings that average the insights of many different, but similar, methods.

The procedure to define local cluster ensembles comprises three steps. First, weights are defined. Denote $x^*=(x_1^*,x_2^*)$ as the point in the metric space of clusterings at which to build a local cluster ensemble. The new clustering defined at this point is a weighted average of nearby clusterings with one weight for each existing clustering in the space. The weight for each existing clustering j is based on a normalized kernel, as:

$$w_j = p(x^*, \sigma^2) \bigg/ \sum_{m=1}^{J} p(x_m, \sigma^2)$$

where $p(x^*,\sigma^2)$ is the height of the kernel (such as a normal or Epanechnikov density) with mean $x^*$ and smoothing parameter $\sigma^2$. The collection of weights for all J clusterings is then $w=(w_1, \ldots, w_K)$.

Second, given the weights, a similarity matrix is created for the local cluster ensemble by using a voting approach, where each clustering casts a weighted vote for whether each pair of documents appears together in a cluster in the new clustering. Thus, recall that $c_j$ is an $N \times K_j$ matrix describing how documents are allocated to clusters for clustering j. The clusterings from all J methods are then horizontally concatenated into the $N \times K$ weighted voting matrix $$V(w) = \{w_1 c_1, \ldots, w_J c_J\} \left( \text{where } K = \sum_{j=1}^{J} K_j \right).$$

The result of the election is a new similarity matrix, which is defined as $S_w = V(w)V(w)'$. This calculation places priority on those cluster analysis methods closest in the metric space of clusterings.

Finally, the k-means clustering algorithm is applied to this new averaged similarity matrix to produce a new clustering defined at point $x^*$ in the metric space of clusterings. Although the k-means clustering algorithm is used in the illustrative embodiment, it can be replaced with any other valid clustering algorithm at this stage and yield essentially the same clustering.

The final step 112 is to provide a map or a geography of clusterings, with nearby clusterings being more similar. This geography organizes results and enables a researcher to choose efficiently one or a small number of clusterings which convey the most useful information, or which meet any other criteria the researcher imposes.

The map is generated by providing the two-dimensional projection of the metric space of clusterings to a display screen 232 as indicated by arrow 230 where clusterings are represented as separate points on a display screen. Each point in the space corresponds to one clustering. Some discrete points may be labeled to give structure to the space. For example, clusterings produced by methods that have come out of prior research may be labeled with the name of the clustering method used to generate them. Other points in this space correspond to new clusterings constructed with a local cluster ensemble. The space is formally discrete, since the smallest difference between two clusterings occurs when (for non-fuzzy clustering) exactly one document moves from one cluster to another. The process then finishes in step 114.

Figure 3:
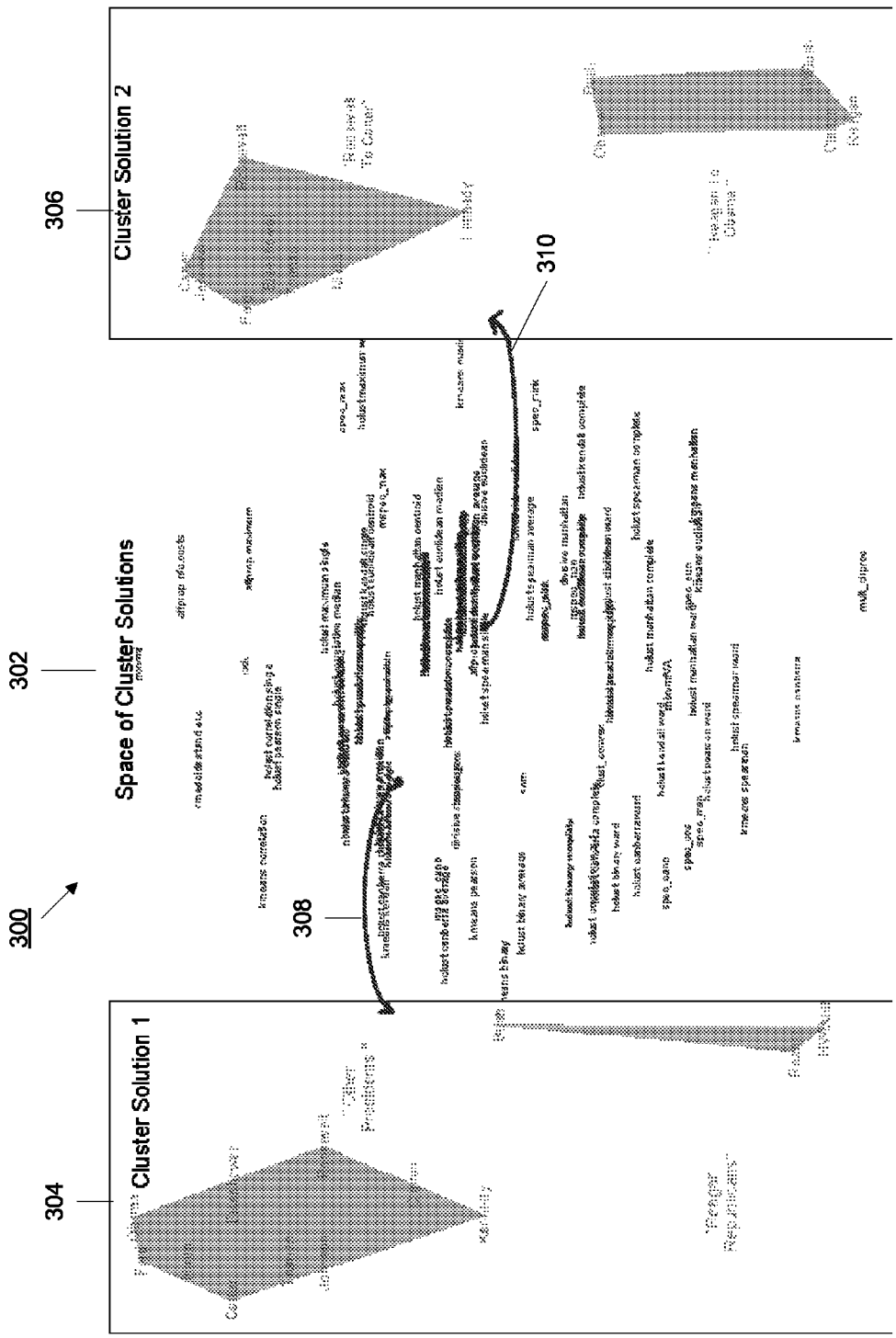
FIG. 3 is an illustrative display of clusterings in accordance with the method of the present invention.

FIG. 3 illustrates one inventive visualization 300 of a space of clusterings, when applied to one simple corpus of documents. In this illustrative example, the initial data set includes the biographies of each U.S. president from Roosevelt to Obama; the biographies were downloaded from the website www.whitehouse.gov.

The two-dimensional projection of the space of clusterings is illustrated in the central panel 302, with individual clustering methods labeled. Each clustering method corresponds to one point in this space, and one clustering of the given documents. The space is formally discrete, since the smallest difference between two clusterings occurs when (for non-fuzzy clustering) exactly one document moves from one cluster to another, but an enormous range of possible clusterings still exists: even this tiny data set of only 13 documents can be partitioned in 27,644,437 possible ways, each representing a different point in this space. In order to reduce the complexity of the diagram only some points have been labeled. The labeled points correspond to clustering methods that have been used in prior research on text documents; other points in this space correspond to new clusterings, each clustering constructed as a local cluster ensemble.

Two specific clusterings 304 and 306, each corresponding to one point as indicated by arrows 308 and 310, respectively, in the central space appear to the left and right of the figure. In these clusterings, labels have been added manually for clarification. Clustering 1 (304), creates clusters of "Reagan Republicans" (Reagan and the two Bushes) and all others. Clustering 2 (306) groups the presidents into two clusters organized chronologically.

Although only two clusters have been shown for clarity, the display is arranged so that a researcher can move a cursor over the space of clusterings and select a single point. When the point is selected, the corresponding clusters in the clustering for that point appear in a separate window. The researcher can then drag the selected point in any direction and watch the clusters in the separate window morph smoothly from clusters in one clustering to clusters in the adjacent clustering.

The inventive method offers a considerably larger space of possible clusterings to search than the methods reported in the literature, but the search space is, of course, still limited by the existing clusterings. If, in applying the method, the results do not seem sufficiently insightful, additional methods can be used to explore some of the remaining uncharted space. Illustratively, two methods are disclosed. First, clusterings from the entire Bell space (the space of all possible clusterings of a set of N objects) can be randomly sampled to generate additional clusterings. These additional clusterings can be added to the original set of clusterings determined by the method discussed above and the visualization can be rerun. As an example, a two step method is used to take a uniform random draw from the set of all possible clusterings. The first step in this method is sample the number of clusters K from a multinomial distribution with probability Stirling(K,N)/Bell(N) where Stirling(K,N) is the number of ways to partition N objects into K clusters (this is generally known as the Stirling number of the second kind).

In the second step, conditional on K, a random clustering is obtained by sampling the cluster assignment for each document i from a multinomial distribution, with probability 1/K for each cluster assignment. If each of the K clusters in the clustering does not contain at least one document, that clustering is rejected and another clustering is obtained.

A second approach to expanding the clustering space beyond the existing clustering algorithms and the local cluster ensembles that are discussed above directly extends the existing space by drawing larger concentric hulls containing the convex hull of the existing clusterings. To do this, a Markov chain on the set of partitions is defined, starting with a chain on the boundaries of the existing clusterings. This is done by considering a clustering of the data $c_j$. $C(c_j)$ is defined as the set of clusterings that differ by exactly by one document: a clustering $c'_j \in C(c_j)$ if and only if one document belongs to a different cluster in $c'_j$ than in $c_j$. The first Markov chain takes a uniform sample from this set of partitions. Therefore, if $c'_j \in C(c_j)$ (and $c_j$ is in the "interior" of the set of partitions) then $$p(c'_j \mid c_j) = \frac{1}{NK}$$

where N is the number of documents and K is the number of clusters. If $c'\notin C(c_j)$ then $p(c'_j|c_j)=0$. To ensure that the Markov chain proceeds outside the existing hull, a rejection step is added: For all $c'_j \in C(c_j)$, $$p(c'_j \mid c_j) = \frac{1}{NK} I(c'_j \notin \text{Convex Hull}).$$

This rejection step ensures that the algorithm explores the parts of the Bell space that are not already well described by the included clusterings. A three stage process applied to each clustering $c_k$ is used to implement this strategy. First, a cluster to edit is selected with probability $$\frac{N_j}{N}$$

for each cluster j in clustering $c_k$. Conditional on selecting cluster j, a document to move is selected with probability $$\frac{1}{N_j}.$$

Then, the document is moved to one of the other K−1 clusters or to a new cluster, so the document will be sent to a new clustering with probability $$\frac{1}{K}.$$

While the invention has been shown and described with reference to a number of embodiments thereof, it will be recognized by those skilled in the art that various changes in form and detail may be made herein without departing from the spirit and scope of the invention as defined by the appended claims.

What is claimed is:

1. A method for selecting clusterings to classify a predetermined numerical data set, the method implemented in a data processor having a memory and a display and comprising:
   (a) using the data processor to sequentially apply a plurality of clustering methods to the numerical data set to generate a plurality of clusterings and storing the clusterings in the memory;
   (b) using the data processor and a metric that measures a similarity between two clusterings generated by a pair of the clustering methods to create a metric space of clusterings in the memory;
   (c) using the data processor to project the metric space to a lower dimensional space of clusterings;
   (d) using the data processor to generate at each point in the lower dimensional space which does not represent a clustering, a clustering for that point based on nearby clusterings; and
   (e) displaying points representing the lower dimensional space on the display.

2. The method of claim 1 further comprising, before step (a) using the data processor to convert non-numerical data to a numerical data set that represents the non-numerical data.

3. The method of claim 2 wherein the non-numerical data comprises a set of text documents.

4. The method of claim 3 wherein each of the clustering methods applied in step (a) assigns each text document to one or more clusters with weights that sum to one.

5. The method of claim 1 wherein the metric in step (b) comprises, for two clusterings, the sum of the conditional entropies of the two clusterings.

6. The method of claim 1 wherein the metric in step (b) comprises a variation of information metric.

7. The method of claim 1 wherein step (c) is performed by using the data processor to perform a projection on the metric space with a Sammon multidimensional scaling algorithm.

8. The method of claim 1 wherein step (c) projects the metric space to a two-dimensional space.

9. The method of claim 1 wherein step (d) comprises creating a new clustering at each point in the metric space of clusterings where no clustering exists from a weighted average of nearby existing clusterings.

10. The method of claim 9 wherein each weight is determined using a normalized kernel and wherein step (d) further comprises creating an averaged similarity matrix for the new clustering and applying a clustering algorithm to the averaged similarity matrix.

11. The method of claim 1 wherein the data processor has a mechanism for selecting a point on the display and step (e) comprises displaying clusters in a clustering corresponding to the selected point.

12. The method of claim 1 wherein each point corresponding to a clustering generated by one of the clustering methods in step (a) is labeled on the display with the name of that clustering method.

13. The method of claim 1 wherein step (a) further comprises adding additional clusterings to the plurality of clusterings by randomly sampling clusterings from the space of all possible clusterings of a set of n objects and adding the random samples to the plurality of clusterings.

14. The method of claim 1 wherein step (a) further comprises adding additional clusterings to the plurality of clusterings by extending the plurality of clusterings with Markov chains to create a concentric hull of clusterings that contains the convex hull of the plurality of clusterings.

15. Apparatus for selecting clusterings to classify a predetermined numerical data set comprising:
   a memory;
   a scheduler that sequentially applies a plurality of clustering methods to the numerical data set to generate a plurality of clusterings and stores the clusterings in the memory;
   a data processor for applying a metric that measures a similarity between two clusterings generated by a pair of the clustering methods to pairs of clusterings to create a metric space of clusterings in the memory;
   a projector that projects the metric space to a lower dimensional space of clusterings;
   a fill-in mechanism that generates at each point in the lower dimensional space which does not represent a clustering, a clustering for that point based on nearby clusterings; and
   a display that displays points representing the lower dimensional space.

16. The apparatus of claim 15 further comprising a text converter that converts non-numerical data to a numerical data set that represents the non-numerical data.

17. The apparatus of claim 16 wherein the non-numerical data comprises a set of text documents.

18. The apparatus of claim 17 wherein each of the clustering methods applied by the data processor assigns each document to one or more clusters with weights that sum to one.

19. The apparatus of claim 15 wherein the metric used by the data processor comprises, for two clusterings, the sum of the conditional entropies of the two clusterings.

20. The apparatus of claim 15 wherein the metric used by the data processor comprises a variation of information metric.

21. The apparatus of claim 15 wherein the projector uses a Sammon multidimensional scaling algorithm to perform the projection.

22. The apparatus of claim 15 wherein the fill-in mechanism comprises means for creating a new clustering at each point in the space of clusterings where no clustering exists from a weighted average of nearby existing clusterings.

23. The apparatus of claim 22 wherein each weight is determined using a normalized kernel and the fill-in mechanism further comprises means for creating an averaged similarity matrix for the new clustering and means for applying a clustering algorithm to the averaged similarity matrix.

24. The apparatus of claim 15 further comprising a mechanism for selecting a point on the display and the display comprises an area for displaying clusters in a clustering corresponding to the selected point.

25. The apparatus of claim 15 further comprising a mechanism that adds additional clusterings to the plurality of clusterings by randomly sampling clusterings from the space of all possible clusterings of a set of n objects and adding the random samples to the plurality of clusterings.

26. The apparatus of claim 15 further comprising a mechanism that adds additional clusterings to the plurality of clusterings by extending the plurality of clusterings with Markov chains to create a concentric hull of clusterings that contains the convex hull of the plurality of clusterings.

* * * * *